United States Patent [19]

Kroyer

[11] 4,191,546
[45] Mar. 4, 1980

[54] PROCESS OF MAKING A BLISTERED, CRYSTALLIZABLE GLASS MATERIAL

[76] Inventor: Karl K. K. Kroyer, Engtoften 3, DK-8260 Viby J., Denmark

[21] Appl. No.: 865,282

[22] Filed: Dec. 28, 1977

[30] Foreign Application Priority Data

Jan. 4, 1977 [GB] United Kingdom ............... 47/77

[51] Int. Cl.$^2$ ............................................. C03B 19/08
[52] U.S. Cl. ............................................. 65/20; 65/22; 106/40 V; 106/41
[58] Field of Search ............................................. 65/20, 22

[56] References Cited

U.S. PATENT DOCUMENTS

| | | | |
|---|---|---|---|
| 1,746,860 | 2/1930 | Lloyd | 106/41 |
| 1,895,159 | 1/1933 | Greenawalt | 106/41 |
| 3,266,879 | 8/1966 | Kroyer | 65/21 |
| 3,302,938 | 2/1967 | Bendy | 106/100 |
| 3,328,180 | 6/1967 | Bon | 106/41 |
| 3,441,396 | 4/1969 | D'Eustachio et al. | 65/22 |
| 3,458,301 | 7/1969 | Kroyer | 65/21 |
| 3,458,331 | 7/1969 | Kroyer | 106/45 |
| 3,503,771 | 3/1970 | Kroyer | 106/238 |
| 3,811,905 | 5/1974 | Kroyer et al. | 106/288 B |
| 3,827,869 | 8/1974 | von Bonin | 65/22 |
| 3,900,303 | 8/1975 | MacKenzie | 65/22 X |
| 3,942,966 | 3/1976 | Kroyer et al. | 65/33 |
| 3,957,528 | 5/1976 | Ott et al. | 106/309 |

FOREIGN PATENT DOCUMENTS 795787  5/1958  United Kingdom .
897125  5/1962  United Kingdom .

*Primary Examiner*—Robert L. Lindsay, Jr.
*Attorney, Agent, or Firm*—Ladas, Parry, Von Gehr, Goldsmith & Deschamps

[57] ABSTRACT

A process is disclosed for making a blistered, crystallizable glass material in a rotary kiln with simultaneous utilization of mineral-containing waste products, particularly fly ash, slag, and ashes from power works and refuse disposal plants, and sludge from water-purification plants.

16 Claims, No Drawings

PROCESS OF MAKING A BLISTERED, CRYSTALLIZABLE GLASS MATERIAL

The present invention relates to a process of making a blistered, crystallizable glass material in a rotary kiln, with simultaneous utilization of mineral-containing waste products, particularly fly ash, slag and ashes from power works and refuse disposal plants, and sludge from water purification plants.

The invention also relates to glass materials obtained by said process and a plant for carrying out said process.

In my U.S. Pat. No. 3,266,879 of Aug. 16, 1966 (British Patent Specification No. 922 782) is described a process of making a similar crystallizable glass material whereby calcareous and siliceous minerals, such as chalk and sand and preferably dolomite are introduced from the upper end of the rotary kiln, and also injected or thrust-in from the lower end of the rotary kiln so that a portion of the injected or thrust-in raw materials in distributed over the firing zone. The portion of the raw materials injected at the lower end is preferably sand.

The introduced raw materials gradually melt, and the formed molten product flows out from the lower end or kiln and is cooled, preferably by shock cooling in a water bath, and is crushed. It will then be crystallizable or partially crystallized. Crystallization may be obtained or enhanced by reheating the crushed material followed by cooling. This makes it possible to produce a white or whitish blistered devitrified granular material having a rough surface, the cleaved surfaces generally extending through the blisters and exposing numerous cavities. The obtained product is extensively used for example for road surfaces and as an aggregate, and may be produced from relatively easily accessible starting materials. However, owing to the whitish color the application of the product is restricted to some degree.

The removal of waste products in an environmental and economic proper way poses a serious problem in the industrial society of today. An example of such a waste product is the vast amounts of fly ash produced by coal-burning power works, said fly ash consisting of varying amounts of unburned carbon, often about 10-30% and various inorganic constituents, particularly oxides, whose composition depends upon the type of the fuel used.

This fly ash presents serious problems by way of pollution because of the difficulty in separating the total amount of fly ash in the conventional filters, and also because the percolate from the dumps and other sites used for depositing the fly ash may contain impurities, such as heavy metals, which by percolation may pollute the drinking water. Besides, it is a problem by itself to find suitable sites for depositing the fly ash without impairing the environment.

Dependent on the efficiency of the power works the fly ash will often contain relatively substantial amounts of carbon, resulting in a considerable loss of energy. Similar problems apply to refuse disposal plants, which in addition to fly ash also produce large amounts of ordinary ashes and/or slag. Here and in the following the term "slag" comprises slag proper, resulting from the melting of the ashes produced during the combustion, as well as ordinary ashes which have not been exposed to so high temperatures that they have melted. Further, the particular problem applies to refuse disposal plants where depending on the composition of the refuse often considerable amounts of harmful gases are produced, such as hydrochloric acid and sulphur compounds, especially sulphur dioxide.

The exhaust gases from both power works and refuse disposal plants, whether they are oil or coal burning, contain substantial quantities of sulphur, particularly sulphur dioxide.

A process making possible industrial utilization of fly ash and slag from power works and refuse disposal plants would thus represent a great technical improvement in several respects, and especially if it was possible to reduce or remove completely the harmful contents of the exhaust gases. The method would be particularly advantageous if also sludge from wastewater purification plants, especially biological purification plants, could be treated.

It has now been found that by means of a process related to the process set forth in the U.S. Pat. No. 3,266,879, as described in greater detail below, minerals from domestic and industrial waste products, particularly fly ash and/or slag from power works and refuse disposal plants may be advantageously used as a part of the raw materials in the production of blistered, possibly crystallized glass materials, and also that the method may be adapted so as to make possible the treatment of the sludge from purification plants.

More specifically, the invention therefore relates to a process of making a blistered, crystallizable glass material, whereby calcareous and siliceous minerals are introduced into a rotary kiln, melted and then discharged, cooled and possibly crystallized, and the invention is characterized by introducing as raw materials a mixture of materials originating from domestic or industrial waste products, waste from purification of wastewater or any type of ashes from for example power works and refuse disposal plants, with calcareous materials and optionally other glass-forming materials.

The claimed process further makes it possible to reduce or remove the sulphur content of exhaust gases from oil or coal burning power works and refuse disposal plants, and in a specific embodiment also to reduce the content of hydrochloric acid in exhaust gases from refuse disposal plants to a considerable extent.

The invention also relates to a plant for carrying out said process.

The process of the invention can be conveniently carried out in a rotary kiln of the type usually employed for producing blistered, possibly crystallized glass materials for example as described in the U.S. Pat. No. 3,266,879. The process is extremely flexible in that by varying the amount and type of the raw materials, their introduction points, the temperature of the kiln and its speed of rotation it is possible to adjust the kiln to obtain blistered, possibly crystallized glass materials having different colors and varying blister fineness according to one's wishes.

If in the process of the invention fly ash and/or slag is to be used, said fly ash and/or slag is enriched with lime, particularly as chalk, and the materials may be introduced from the upper end or in combined co-current and counter current when they are introduced from the upper as well as the lower end of the kiln. The choice between these alternatives depends for example upon the carbon content of the fly ash, a high content of carbon being advantageous in respect to the injection at the lower end of the kiln.

The composition of the fly ash and the slag, including their content of $SiO_2$, $Al_2O_3$ and $CaO$ will vary with the coal used in the combustion and with the composition of the refuse. In the method of the invention the content of minerals will be adjusted in accordance with the desired end product, but in practice $CaCO_3$ will alway be added, often as chalk, and in such amounts that the end product has a CaO content of 20–30% by weight, preferably about 25%.

Beyond that, it may be necessary to adjust the content of $Al_2O_3$, which in the case of the crystallizable glass materials should not exceed 5%.

The application of fly ash and slag results of course in a considerable saving in raw materials and also in the removal of a waste product in an extremely expedient manner. It has great economic importance that owing to the mineral contents of the ashes or the slag it is usually possible to omit the dolomite which is in general obligatory in the known process, and which is the relatively most expensive of the three raw materials, at any rate after the starting-up of the rotary kiln process.

Co-ground fly ash and/or slag and chalk may be used, but it has been found that such grinding can be avoided in the process of the invention, the fly ash being added direct to a slurry of chalk and any other raw materials. Fly ash is often so fine that it may be injected direct into the kiln without previous grinding. This is of course a great advantage in terms of process procedure, and it also results in a considerable saving in energy.

For the production of blistered, possibly crystallized glass materials a typical mix proportion is about 80% of ashes and about 20% of chalk.

For the production of blistered, possibly crystallized glass materials the raw materials are melted completely, which is facilitated by the low content of lime in the product, only amounting, as mentioned, to about 20–30% CaO.

This process is started in a manner known per se, cf. the above patent, for example by injecting an aqueous slurry of the raw materials, such as sand, lime and dolomite into the rotary kiln, followed by a continuous melting process.

The kiln is advantageously heated by injecting oil together with a portion of or the total amount of fly ash with a composition adjusted according to the end product and which is to be introduced from the lower end of the kiln. The application of oil is advantageous because its higher flash point and thereby the temperature of the firing zone affords an added guarantee of the residual carbon of the fly ash being utilized in the combination. The fly ash is preferably injected together with the primary air. The mineral-adjusted fly ash may alternatively be injected through one or more separate tubes in the vicinity of the fire tubes of the kiln, or may, in certain cases, be mixed with the oil.

The process is also very advantageous in connection with coal-firing; when charging the amount of chalk used for adjusting the mineral content in the fly ash to be injected from the lower end of the kiln, an additional amount of chalk is added compensating for the ashes formed from the coal during the combustion. This also makes it possible to utilize less valuable types of coal, such as lignite, as long as the charging of chalk is adjusted so as to give a composition suitable for the end product.

If desired, fly ash is injected from the lower end together with the necessary amount of chalk and the oil used in the burning process. Alternatively, sand may also be injected in a manner known per se, cf. the above U.S. Pat. No. 3,266,879, or as is described in U.S. Ser. No. 819,036 filed July 25, 1977 calcium sulfate, possibly in a composition with chalk. These raw materials are injected into the kiln over a long zone where they are caught by the molten mass and having passed the kiln they are also caught by the filters as dust. During this passage the ignitible materials of the fly ash are burned whereby energy is supplied to the melting process.

The filter dust is recycled, as is explained in greater detail below, to a suitable location in the kiln, either to its upper end, or to the slurry of the raw materials or to the lower end of the kiln.

The raw materials introduced at the upper end of the kiln may also wholly or partially be constituted by fly ash mixed with chalk, which will cause the carbon content of the fly ash to be trapped in the mass and said carbon content is not liberated to form blisters until the molten mass has attained such a low viscosity that the combustion products are allowed to escape. In this way an advantageous supply of energy to the process is obtained.

It is important that the end product has an $Al_2O_3$ content not exceeding 5%, as otherwise it will be impossible to obtain the desired crystallization under formation of extra strong aggregates.

Crystallization of the molten blistered mass may advantageously be performed during slow cooling, optionally followed by reheating. It is particularly advantageous to direct the molten mass on the a cold conveyor belt, and allow it to stabilize into a suitably low thickness of some centimeters by cooling the surface with water so as to obtain slow crystallization owing to the good insulating effect brought about by the blisters.

The process according to the invention may also be applied to utilization of slag derived from combustion of domestic and/or industrial refuse in refuse disposal plants. In this case the ground slag, preferably in a mixture with chalk and possibly sand and/or fly ash is directed into the upper end of the rotary kiln, which introducing, if desired, a corresponding product from the lower end, or possibly only fly ash and chalk or possibly sand and/or calcium sulfate as explained above.

A suitable mixture is for example 50 parts by weight of slag, 25 parts by weight of sand and 25 parts by weight of chalk or 50 parts by weight of fly ash, 25 parts of slag from the combustion of domestic refuse and 25 parts of chalk.

It has been found that a slag content of up to about 5% by weight of the total raw materials has normally no noticeable effect on the colors of the end product. Quantities of 5–10% by weight usually result in a greenish or greyish shade. Depending upon the $Fe_2O_3$ and $Al_2O_3$ content in the slag which may inhibit the later crystallization just as much sand and chalk is usually added, preferably 2 or 3 times as much, to make the end product crystallizable and smooth out seasonal fluctuations in the mineral composition of the slag.

It will thus be seen that by varying the raw materials various shades in the final products can be obtained.

The process according to the invention can of course be carried out with fly ash and/or slag of any type independently of their places of origin, but is particularly useful for the production of the subject glass materials in direct connection with a power works or refuse disposal plant. In the first place, one has direct access to the fly ash and/or slag, and utilizing the residual carbon of the fly ash or slag in the rotary kiln means that it is not necessary to operate the power works or refuse disposal plant with view to complete combustion of the coal.

In practice it is expensive and difficult to reduce the carbon content of fly ash to below 10%, and it is therefore possible to obtain a considerable saving in initial, repair and operating expenses of the works if a content of, for example, from 20% to 50% of unburned carbon in the exhaust gas and fly ash and slag could be permitted. The essential part of this unburned carbon can be utilized in the process according to the invention, which offers a great advantage over the other alternative of increasing the heating surfaces of the power works or refuse disposal plants.

Finally, by a modification of the process according to the invention another important problem is solved, viz. removal of the sulphur content of the exhaust gases. Whether the power works or refuse disposal plants are oil or coal-burning substantial amounts of sulphur are given off to the ambient, and therefore the authorities have in recent years imposed heavy restrictions on suitable fuels and made heavy demands on purification of the exhaust gases respectively. Unlike oil, this is complicated by the absence of known methods of pretreating coal in order to reduce the sulphur content.

As stated, the filters in the process according to the invention will collect some filter chamber dust being generally chalky and dust from the fly ash or slag. When passing through such filters sulphurous exhaust gases will give off a substantial portion of their content of sulphur to the chalk and convert this to calcium sulfate.

The experience from blistered glass production plant using 35 metric tons of heavy fuel oil per day has shown that it is possible to absorb about 80% of the sulphur content in the exhaust gases.

This fact makes possible a particularly interesting modification of the process according to the invention when carried out in connection with power works or refuse disposal plants. By conducting the chalky dust from the rotary kiln to the hot gas filters, such as bag filters or electro filters, of the power works or refuse disposal plant it actually becomes possible to save the filters associated with the rotary kiln but also to bond the sulphur of the exhaust gases as calcium sulphate in the filter dust which in the filters is mixed with the fly ash, while the gases with a substantial reduced sulphur content may be discharged to the ambient.

Furthermore, if desired, it is possible to charge before the filters an additional amount of chalk, for instance about 25%, for adjustment of the mineral content, which makes it possible to draw direct from the filters a raw material of the desired compostion for the production of glass or cement, and wherein the sulphur is safely bonded.

It is thus possible by suitable charging with chalk to obtain direct from power works and refuse disposal plants a fly ash suitable for the preparation of a melt for the production of glass, and which contains the sulphur content bonded in a form where it will not be liberated to the ambient.

Beyond constituting a particularly expedient solution to the problem of removing ashes and slag from the combustion of refuse the process according to the invention represents also a solution to another urgent problem, viz. removal or at least a substantial reduction of the content of harmful gases, particularly hydrochloric acid and sulphur oxides in the exhaust gases from the combustion, for example originating from the content of PVC and other chlorine-containing polymers of the refuse.

Thus, a considerable saving in the transport of ashes and slag and an improved heat economy are obtained by combining a refuse combustion, for example in a roasting kiln, with a direct introduction of the formed ashes and slag in the upper end of the rotary kiln to which also the raw materials, especially lime (chalk), sand and/or fly ash, necessary to produce the glass materials are directed. It is also obtained that all the refuse is burned if not in the roasting kiln then in the rotary kiln, and that if the refuse should comprise residues of for example building materials and similar non-inflammable materials, such residues are incorporated in the melt formed. Further, by directing at least part of the gases from the combustion kiln through the rotary kiln from its lower end (firing end) there are obtained an improvement in the heat economy and also at least a partial neutralization of the acid gases owing to the alkaline materials in the contents of the kiln, particularly $CaCO_3$ and $CaO$ both in the melt and in the mixture of raw materials in the upper, colder part of the kiln, said mixture being a slurry in the wet process. As mentioned above, the exhaust gases of the rotary kiln contain a certain amount of entrained fine particles, especially chalk dust and fly ash which are separated off in the filter and some neutralization will therefore take place during the passage from the kiln to these filters, which neutralization is finished after the passage through the filters owing to the amount of lime collected and possibly further charged there, in a manner similar to that explained above in connection with the sulphur content in the fuel. Furthermore, the fly ash will, depending upon its mineral composition, be able to neutralize a certain amount of HCl.

The connected filter dust, which thus consists essentially of unreacted $CaCO_3$ or $CaO$, and $CaSO_4$ and $CaCl_2$ formed by the neutralization, as well as possibly fly ash, is returned continuously or batchwise to the rotary kiln. It may either be introduced as a part of the mixture of the raw materials from the upper end of the kiln, possibly as a slurry, or be injected from the lower end of the kiln analogously with the process described in my U.S. Ser. No. 819,036 filed July 25, 1977, resulting in an advantageous cooling of the lining of the kiln and owing to the high viscosity of the molten mass in a retainment of any gaseous cleavage products in the form of blisters.

Such an injection from the lower end of the kiln, whether in case of filter dust or fly ash whose residual carbon content is to be utilized, may advantageously be supported by slanting downwardly the flame of the burner used for firing the kiln which will direct the particles down towards the melt. This will also ensure that the tapholes, which are provided at the lower end of the kiln for removal of the molten glass material, are not clogged. it has been found that a particularly expedient firing of the kiln is obtained by means of a so-called turning flame.

As mentioned above, the process of the invention can also be used for treating sludge for example from biological or other purification plants. For this purpose the content of dry matter of the sludge may advantageously be increased to for example 30–40% by adding other raw materials, such as chalk, sand, slag and fly ash, used in the process whereupon this paste-like slurry of raw materials is introduced to the upper end of the kiln. If desired, the sludge may also be subjected to a varying degree of evaporation prior to admixing the other raw materials.

A number of iron chains are advantageously suspended from the upper end of the kiln. These iron chains act as heat exchangers and owing to the moistening with slurry they also contribute to the retaining of some of the light particles entrained by the exhaust gases and thus to incorporating said particles in the slurry of the raw materials.

A plant for carrying out the process according to the invention is therefore, as will be understood from the above, profitably characterized by comprising a combustion kiln from an oil and/or coal-burning power works or refuse disposal plant particularly in the form of a roasting kiln and one or more rotary kilns including the necessary feeding, recycling and discharging means, as well as other auxiliary equipment, such as crushing means, mixing means, etc., and one or more common filters, such as bag filters, electro-filters or cyclones.

In a preferred embodiment of such a plant the combustion kiln is mounted in direct connection with the roasting kiln and is provided with means for transferring exhaust gases and ash products to the rotary kiln.

The glass material therefore lends itself to numerous purposes, such as production of aggregate for ceramics, so-called low temperature ceramics as dealt with in my U.S. Ser. No. 759,226 filed Jan. 13, 1977, mineral-resinous matrices as dealt with in my U.S. Ser. No. 798,980 filed May 20, 1977 and sheet products particularly corrugated sheets as dealt with in my U.S. Ser. No. 804,421 filed June. 8, 1977, building materials and road surfaces. A particularly important field of application is to replace asbestos sheet materials.

It applies to all the materials that a black, blistered glass material can be obtained by using fly ash, which has not been possible in the methods previously described. Such a black material is especially important for the production of materials for roofings, for example the above corrugated sheets. Known black roofings have usually been subjected to a dyeing which is both difficult and/or not fast.

After crushing with a great part of the blisters cleaved the highly blistered glass material obtained, shows a large number of concave surfaces so that the individual particles, which according to circumstances may have several concave surfaces, may easily be meshed together.

By means of suitable binding agents it is thus possible to obtain products having a good tensile strength, and it is particularly of importance that it is possible to avoid the application of fibres, for example in the form of asbestos, which were previously often necessary.

A particularly interesting material is concrete obtained from a cement material prepared according to the co-pending patent application Ser. No. 865,153 filed Dec. 28, 1977, where the aggregate used is a blistered crystallized glass material prepared according to the invention. This material shows, as mentioned, a large number of concave surfaces causing the individual particles mesh which imparts to such cement-bonded concrete a very high tensile strength. Beyond a concrete proper it is also possible to obtain sheet products having a good mechanical strength.

The fact that in the production of the above products two raw materials may be used whose mineral composition, apart from the CaCO content, may be identical, likewise results in an excellent compatibility between the components, which makes it possible to avoid harmful reactions that could adversely affect the properties of the end products.

the invention will be further illustrated by the examples below.

EXAMPLE 1

For this and the following examples a rotary kiln was used, having a length of 70 m and a diameter which was 2 m over the first approximately three-quarter length and about 2.8 m over the remaining length. The kiln inclination was about 2° and the kiln made one revolution for every 65 seconds.

Iron chains are hanging from the walls over the first 10–15 meters of the kiln to produce good heat transfer to the raw materials introduced and afford a larger surface contributory to retention of dust, especially when the wet process is applied.

(A) A mixture of raw materials in slurry form was prepared from the following raw materials:

65 parts of sand from Limfjorden and North Jutland and 45 parts of chalk from the same region, viz. from Hillerslev and additionally 15 parts of dolomite from Hammerfall in the northern part of Norway, mixed with water to form a slurry having a moisture content of 24%.

With a capacity equal to 13 tons of dry raw materials per hour the slurry was introduced to the upper end of the rotary kiln. The materials were heated in the kiln by firing with heavy fuel oil from the lower end thereof.

As the heat in the upper end of the kiln partially desiccated the raw materials, the latter formed nodules. Further down in the kiln there was formed a pasty material with large lumps by partial caking of the nodules.

Passage through the kiln takes about three to four hours, and at the lower end of the kiln, where the temperature was about 1450° C., the mixture melted to form a blistered liquid product which was discharged from the lower end of the kiln.

This product could be cooled to form crystallized blistered glass suitable for a large number of purposes, such as aggregate for road surfaces, building materials, etc.

(B) Now the composition of raw materials was continuously modified by using 80 parts by weight of fly ash from the Power Works at Aarhus (Studstrup) and 20 parts by weight of chalk deriving from the above location were added. Studstrup stated this fly ash to be composed as follows:

|  | % by weight |
| --- | --- |
| $SiO_2$ | 55.9 |
| $Al_2O_3$ | 4.16 |
| $Fe_2O_3$ | 10.6 |
| $CaO$ | 19.1 |
| $SO_3$ | 1.17 |
| $P_2O_5$ | 0.23 |
| $MgO$ | 3.31 |
| $TiO_2$ | 0.18 |
| $Na_2O$ | 0.17 |
| $K_2O$ | 0.36 |
| $Li_2O$ | 96. ppm |
| Ignition loss | 17.93 |

These raw materials were likewise admixed with water to obtain a consistency permitting them to be introduced in slurry form to the upper end of the kiln.

The raw materials travelled down through the kiln in the same manner as described above.

A crystallizable material similar to that above was formed, except, however, that this material had a dark color, almost olive black and partly transparent.

(C) In a third step carried out in continuation of step (B) a portion of the same raw materials, that is fly ash and chalk in the same proportions, but in a dry state, was introduced at the lower end of the kiln. An amount of raw materials equal to about 35% of the total amount of raw materials was introduced at the lower end of the kiln. It was found that they could be introduced both together with the primary air and through a separate tube next to the intake of primary air.

When introducing the raw materials in the stated amount at the lower end of the kiln, it was possible to reduce the oil consumption from about 1300 liters per hour in step (A) to about 950 liters per hour in step (C). This proves that the carbon content of the Studstrup fly ash was utilized in heating the kiln.

The amount of finished material as blistered crystallizable glass discharged from the lower end of the kiln was about 220 tons per day. A sample fraction with a granulometry of from 5 to 7 mm had a bulk density of 850 g/l indicating a high blister content. From the upper end of the kiln there was deposited in the associated filter an amount of chalk and fly ash of about 10% of the amount introduced, and an analysis showed that practically all of the carbon of the fly ash had been removed and thereby utilized during the stay in the rotary kiln. The filter content was recycled to the slurry tank.

EXAMPLE 2

(A) The composition of raw materials was modified as follows:

60 parts by weight of fly ash from Studstup and 18 parts by weight of slag from a refuse disposal plant plus 22 parts of chalk were stirred to form a slurry and pumped into the upper end of the kiln.

The slag originated from incinerated domestic waste and its most important components were:

| | |
|---|---|
| $SiO_2$ | 50% |
| $Al_2O_3 + TiO_2$ | 12% |
| $Fe_2O_3$ | 16% |
| CaO | 7% |
| MgO | 1% |
| $K_2O$ | 5% |
| Ignition loss | 5% |

The procedure of Example 1(B) was followed and resulted in a molten glass which after discharge showed no difference from the product obtained in Example 1(B) in respect to color, strength and appearance, the finished product being likewise blistered, crystallizable and had a black greenish transparent color.

(B) Based on the same raw materials the test was repeated analogous to Example 1(C), and in this case 20 parts of the Studstrup fly ash were mixed with 6 parts of chalk without adding slag and introduced in a dry state at the lower end of the kiln. The remainder of the raw materials was introduced in the form of a slurry from the upper end of the kiln. In this case the oil consumption was about 1000 liters per hour. The product possessed the same properties as mentioned above.

EXAMPLE 3

(A) An additional example of producing crystallizable glass used 40 parts of fly ash of the aforesaid grade from Studstrup and 40 parts of fly ash from the power works "Nordkraft Elektricitetsværk" at Aalborg. The fly ash of the Studstrup Works had the same composition as specified above by Studstrup, whereas Nordkraft stated the following composition:

| | % by weight |
|---|---|
| $SiO_2$ | 32.3 |
| $Al_2O_3$ | 16.3 |
| $Fe_2O_3$ | 8.4 |
| CaO | 2.2 |
| MgO | 0.4 |
| Alkali | 3.1 |
| $SO_3$ | 2.8 |
| Ignition loss | 33.6 |
| Various | 0.9 |

This total of 80 parts of fly ash was mixed with 20 parts of chalk of the type specified in Example 1 in water to give a slurry suitable for pumping having amoisture content of about 25%. On a day basis 240 tons of fly ash and 60 tons of chalk were introduced at the upper end of the kiln. The test was carried out as a continuous transistion from the foregoing Example 1, and this mixture of raw materials was found to result in a product of substantially the same appearance, viz. black olive and transparent. The amount of finished material was about 200 tons per day while about 10 tons of dust were collected in the filter and recycled to the slurry tank. It was found, however, that this material, neither by slow cooling nor by reheating, could readily form crystals making it a devitrified glass.

Consequently, crystallization was very slow which is assumed to be due to the higher $Al_2O_3$ content of the Nordkraft fly ash.

(B) The raw materials of the above composition were then divided, whereby two thirds of the raw material solids were introduced in slurry form from the upper end of the kiln and one third was injected from the lower end of the kiln.

The resultant saving in fuel was remarkable, the high carbon content of the Nordkraft fly ash being highly utilized, with the effect that the amount of oil used for melting the product itself was about 50% or less than the caloric amount which would otherwise be required to melt and calcinate such raw materials as for example described in Example 1(A).

The melting point of this product was about 100° C. lower than that of the product according to Example 1, and this is assumed to be due to the higher $Al_2O_3$ content of the Nordkraft raw materials.

It was evident that the production of glass materials by the method according to the invention involved a considerably lower caloric consumption than necessary when using ordinary raw materials for the production of glass. The energy saving may thus be as high as 20 to 35%.

However, an exact measurement of the caloric consumption was not possible in these tests, firstly because they were performed under pressure of time in rapid succession in the course of 3–4 days and no attempts were made to optimize the process conditions or the distribution of the raw materials between the upper and lower end, and secondly because the lining in the rotary kiln was very thin in the firing zone when the tests were started, for which reason the outer temperature was so high at certain spots that it was necessary to cool the exterior of the kiln over a 10 m long zone to prevent it from being damaged by the excessive temperature.

In conclusion it should be emphasized that the invention has great importance in respect to environmental and social aspects.

It should thus be mentioned that the Danish power works alone are currently producing more than 200,000 tons of fly ash per year, and before the end of 1980 probably at least 350,000 tons of fly ash. This makes possible a production of blistered glass according to the method of the invention of about 200,000 tons and at least 350,000 tons respectively.

Regarding blistered glass as an alternative to asbestos products, Denmark is currently producing and consuming more than 500,000 tons of products incorporating asbestos. A substantial proportion thereof is sheets for roofing and facade cladding, etc.

The subject glass products have thus vast potential applications not only for such products where the health hazardous asbestos has up to now been used but also for a lot of other applications as explained in detail above.

What I claim is:

1. A process of making a blistered crystallizable glass material with simultaneous utilization of mineral-containing waste products comprising the steps of:
   supplying to the upper end of a rotary kiln as raw materials a mixture of materials originating from domestic or industrial waste products with calcareous materials and optionally other glass-forming minerals in such a mix proportion that the finished glass material made therefrom will show a content of about 20–30% by weight CaO and no more than about 5% by weight $Al_2O_3$ keeping said rotary kiln at a temperature sufficient to melt the raw materials supplied during their passage therethrough to form a molten bath flowing downwards through the lower part of said rotary kiln causing the molten material thus formed to flow off from the lower end of said kiln and subsequently cooling said material thereby to form a blistered crystallizable material.

2. A process according to claim 1 in which the material originating from domestic or industrial waste products is fly ash from power works or refuse disposal plants.

3. A process according to claim 1 in which the material originating from domestic or industrial waste products is slag from power works or refuse disposal plants.

4. A process according to claim 1 in which the mixture of raw materials is supplied in the form of a slurry comprising sludge from wastewater purification plants.

5. A process according to claim 4 in which the slurry further comprises at least one waste product selected from the group consisting of fly ash and slag.

6. A process according to claim 1 in which a mixture of about 80 parts of weight of fly ash and 20 parts by weight of chalk is supplied to the rotary kiln.

7. A process according to claim 1 in which a mixture of about 50% by weight of fly ash, about 25% by weight of slag and about 25% by weight of chalk is supplied to the rotary kiln.

8. A process according to claim 1 in which a mixture of about 50% by weight of slag, about 25% by weight of sand and about 25% by weight of chalk is supplied to the rotary kiln.

9. A process of making a blistered crystallizable glass material with simultaneous utilization of mineral-containing waste products, comprising the steps of:
   supplying as raw materials a mixture of materials originating from domestic or industrial waste products with calcareous and optionally other glass-forming minerals to the upper end of a rotary kiln,
   keeping said rotary kiln at a temperature sufficient to melt the raw materials supplied during their passage therethrough to form a molten bath flowing downwards through the lower part of said rotary kiln,
   injecting fly ash from the lower end of said rotary kiln above said molten bath over the burning zone of said rotary kiln thereby to burn residual carbon in the fly ash and to at least partially incorporate the remainder in said molten bath with the proviso that the raw materials are supplied to the upper end of the rotary kiln and the fly ash is injected from the lower end in such amounts that the finished glass material made therefrom will show a content of about 20–30% by weight CaO and not more than about 5% by weight $Al_2O_3$
   and causing the molten material thus formed to flow off from the lower end of said rotary kiln and subsequently cooling said material thereby to form a blistered crystallizable material.

10. A process according to claim 9, in which fly ash is injected from the lower end in admixture with calcareous materials.

11. A process according to claim 10 in which a mixture of fly ash and chalk is injected.

12. A process according to claim 9 in which the major part of the raw material is supplied to the upper end of the rotary kiln.

13. A process according to claim 11, in which about 65 percent by weight of the raw materials is supplied to the upper end of the rotary kiln.

14. A process according to claim 1 wherein at least part of the supplied raw materials is constituted by filter dust collected in a filter mounted in connection with said rotary kiln.

15. A process according to claim 10 in which the mixture of fly ash and calcareous materials at least partially is constituted by filter dust collected in a filter mounted in connection with the rotary kiln.

16. A process according to claim 10 in which the calcareous materials are $CaCO_3$ and CaO together with minor amounts of $CaSO_4$ and $CaCl_2$ originating from neutralization of acid constituents in exhaust gases from the rotary kiln.

* * * * *